United States Patent [19]

Lee et al.

[11] 4,375,484

[45] Mar. 1, 1983

[54] FROZEN BATTER AND PROCESS

[75] Inventors: Charleston R. Lee, Weston, Conn.; Joseph J. Russo, New Windsor; Shirley A. Jeter, Bronx; Thomas P. Sullivan, Lake Carmel, all of N.Y.

[73] Assignee: General Foods Corporation, White Plains, N.Y.

[21] Appl. No.: 248,381

[22] Filed: Mar. 27, 1981

[51] Int. Cl.$^3$ ............................................. A21D 10/00
[52] U.S. Cl. .................................... 426/549; 426/552; 426/553; 426/652; 426/293; 426/302
[58] Field of Search ............... 426/549, 552, 553, 602, 426/613, 652, 293, 302

[56] References Cited

U.S. PATENT DOCUMENTS

| | | | |
|---|---|---|---|
| 2,462,760 | 2/1949 | Mitchell et al. | 426/602 |
| 3,021,220 | 2/1962 | Going et al. | 426/331 |
| 3,340,067 | 9/1967 | Wallis | 426/552 |
| 3,519,441 | 7/1970 | Ferrara et al. | 426/445 |
| 3,582,350 | 6/1971 | Werbin et al. | 426/578 |
| 3,620,763 | 11/1971 | Hans et al. | 426/116 |
| 3,723,137 | 3/1973 | Fischer et al. | 426/293 |
| 3,784,710 | 1/1974 | Earle | 426/549 |
| 3,956,515 | 5/1976 | Moore et al. | 426/302 |

OTHER PUBLICATIONS

*Steamed Wheat Flour,* Burrus Mills, Incorporated, Published Prior to Filing Date.

*Primary Examiner*—Jeanette M. Hunter
*Attorney, Agent, or Firm*—Thomas R. Savoie; Daniel J. Donovan

[57] ABSTRACT

The coating batter composition disclosed preferably comprises a continuous aqueous phase comprising 20 to 85% water, from 3 to 30% flour which has been heat treated under conditions effective to eliminate substantially all viable microorganisms and inactivate enzyme activity, from 1 to 20% starch, from about 0.05 to 5% of a gum, a preservative system and a flavoring system of oleoresins extracted from natural spices; and a discontinuous fat phase comprising from 0.3 to 55% of a fat and from 0.025 to 10% of an emulsifier, the batter composition being effective to provide bacterial stability and prevent substantial sugar formation for at least 14 days at a temperature of 40° F.

21 Claims, No Drawings

FROZEN BATTER AND PROCESS

DESCRIPTION

Technical Field

The present invention relates to batter products for coating foods prior to frying, and particularly to an improved ready-to-use batter composition which remains stable for extended periods of time and to the process for preparing it.

Batter coated fried foods have a broad appeal. Among the most popular batter coated foods are fried chicken and other meat products; however, a wide variety of other foods, such as vegetables, and even fruits can be coated then cooked by frying or baking. Because of the great popularity of these foods, there are presently known a number of formulations and coating procedures. Unfortunately, the known methods for preparing and storing these compositions have either detracted from their convenience to the consumer or the final product quality. There remains a need for a composition which is capable of being stored for extended periods of time prior to use and yet produces high quality fried or baked products when coated onto a wide variety of foods, and further which enables the storage of unused portions under ordinary refrigerator conditions for periods of time practical to the consumer.

Background Art

Early attempts at providing convenient batters for home use involved packaging the dry ingredients for final mixing by the consumer just before use. This type of mix was more convenient than starting from scratch, which necessitated separately measuring out and mixing the dry ingredients prior to preparation. However, because the dry mixes are usually packaged in portion-controlled units, or because the consumer often overestimates the amount needed, an unused portion typically results. Wastage of unused portions is almost inevitable because the compositions are not stable to bacteriological growth when stored in a refrigerator for more than a couple of days, and only a small number of consumers would prepare two batches of fried foods within the period of stability. Further, due to the activity of enzymes in the batter, sugars would develop on storage in the refrigerator which would cause excessive browning and burning of the product when coated onto a product and cooked at high temperatures, e.g. by frying in which the temperatures typically exceed 300° F. (150° C.).

A number of approaches have been taken to avoid the problem of wastage. One of these involved preparing storage-stable liquid batters. For example, in U.S. Pat. No. 3,021,220 to Going et al there is described what amounts to an intermediate-moisture liquid batter composition. This composition contains high levels of soluble solids, such as sugar, and low levels of moisture. Supplemental bacteriological stability is obtained through the use of various bacterial inhibiters. U.S. Pat. No. 3,620,763 by Hans describes a batter which is also of the intermediate moisture variety, but is leavened and can be packaged for distribution is pressurized containers. The Hans compositions contain sufficient levels of edible humectants to reduce the water activity ($A_w$) to a level within the range of about 0.80 to about 0.94. However, both the Going et al and the Hans patents are directed to batters for cakes and their compositions would not be suitable for coating food followed by cooking at high temperatures because of the resultant excessive browning or burning due to the sugars in the compositions.

Another approach is exemplified in U.S. Pat. No. 3,956,515 to Moore et al which discloses starch batters which can be applied to food pieces such as chicken which are breaded and then frozen for subsequent preparation by frying in the frozen state. The batter starches are disclosed to comprise un-gelatinized cold water swelling starches and starch granules having a gelation point above 125° F. (50° C.). However, stability of these batters upon thawing does not permit storage at ordinary refrigerator temperatures for practical periods of time.

As a variation to the older concept of providing dry batter mixes for preparation just prior to use, in U.S. Pat. No. 3,723,137 Fischer et al prepare a continuous adherent batter by wetting a food piece and then coating it with a dry composition comprising 3 to 45 weight percent gelatinized starch, 28 to 97% un-gelatinized starch, 0 to 8 weight percent leavening acid, 0 to 8 weight percent sodium bicarbonate, 0 to 10% salt, and 0 to 8 weight percent browning agent. A coating mix adopted for baking additionally comprises shortening beads, expanded gelatinized particles and a crisping agent such as algae gum or modified starches. This coated product is then further dipped in a liquid such as water. In addition to the principal ingredients, a wide variety of spices and flavoring agents can be employed. Procedures of this type, however, require considerable care and effort on the part of the consumer, and it would be desirable to make preparation easier.

Thus, while the concept of preparing a coating batter for food appears simple, and the ingredients such as starches, spices, flour, water, and the like, are well known and understood food ingredients, the preparation of a truely convenient, yet good tasting and storage-stable product is a complex problem which has not been effectively solved by the prior art.

Disclosure of Invention

Applicants have discovered that it is possible to prepare a coating batter which not only has a greatly extended storage stability in its packaged frozen form, but which further has the stability to permit storage of unused portions for a period of at least two weeks at refrigerator temperatures. It is an imporatant feature of the invention that storage under both conditions does not adversely affect the color, flavor, or coating or cooking quality, nor is there a development of sugars which would cause excessive browning or burning at high cooking temperatures. Additionally, this batter composition provides bacterial stability under storage at both conditions without pasteurization (a high temperature bacteria kill step), as pasteurization at temperatures above 160° F. (70° C.) would gelatinize the flour or starch rendering the batter composition ineffective for coating purposes.

The present invention provides an aqueous batter composition and a process for preparing it wherein the composition is capable of storage for extended times in the frozen state followed by refrigerator storage for at least 14 days. The aqueous batter composition comprises, based on the total weight of the composition: a continuous aqueous phase comprising from 20 to 85% water, from 3 to 30% flour which has been heat treated under conditions effective to eliminate substantially all viable microorganisms and inactive enzyme activity, preferably from 1 to 20% starch, a gum to thicken the batter and provide a crisp texture upon cooking, a flavoring system preferably comprising oleoresins extracted from natural spices, a preservative system, and preferably a discontinuous fat phase comprising from 0.3 to 55% of a fat and from 0.025 to 10% of an emulsifier, the batter composition being effective to prevent the development of sugars and to provide bacterial stability for at least 14 days at a temperature of 40° F. (5° C.). To be stable against bacterial growth the Standard Plate Count (SPC) for the batter should be maintained below 20,000 SPC, preferably below 10,000 SPC during storage.

The process for preparing the composition of the present invention comprises: blending the fat, the gum and the emulsifier at a temperature effective to maintain the fat in a liquid state, and to disperse the gum; blending the water with the preservative system for a time and at a temperature effective to dissolve the preservative system to form a preservative solution; blending the fat blend with the preservative solution under conditions of time, temperature and agitation to produce an oil-in-water emulsion; blending the flour, flavoring and starch to form a uniform dry blend; admixing the dry blend with the oil-in-water emulsion to prepare a batter admixture while maintaining a temperature less than the gelatinization temperature of the starch, preferably from about 50° to 90° F. (10° C. to 35° C.); and homogenizing the batter admixture under conditions effective to produce a smooth liquid batter.

The composition of the present invention has an overall stability, including stability against color change, flavor change, emulsion breakdown, sugar formation which causes excessive burning or browning during cooking at high temperatures, viscosity change, and bacterial and enzymatic deterioration throughout the period of extended storage under frozen conditions and for a period of at least two weeks after thawing and storage at refrigerator temperatures. This bacterial stability is achieved without pasteurization which would gelatinize the flour and starch rendering the batter composition ineffective for coating purposes. Surprisingly, the preferred batter composition has been found to be stable for periods up to four weeks at refrigerator temperatures (i.e. 40° F., 5° C.). This is enabled by the use of a composition which has several critically-interrelated, essential ingredients.

Importantly, the composition of the present invention comprises sufficient water to make the composition fluid under normal refrigerator temperature conditions. At the lower end of the scale, it is found that at least 20% water by weight of the composition is necessary to enable the composition to be coated on a food product with practical ease. Preferably, however, the water should comprise from about 60 to 75% of the weight of the composition. The amount of water and other viscosity-controlling ingredients will be balanced to provide a viscosity within the ranges detailed later which permits uniform coating of food articles.

It is essential to the composition to employ from about 3 to 30% flour by weight of the composition to achieve the typical batter-like dipping consistency and textural quality upon cooking. This flour critically must be of a type which has been heat treated under conditions effective to eliminate substantially all viable microorganisms and inactivate enzyme activity. As further descriptive of the properties of flours suitable according to the invention, U.S. Pat. No. 3,519,441 to Ferrara et al is incorporated herein by reference in its entirety. We have found that the reduced microbiological contamination and enzymatic activity of these flours are essential where an aqueous batter composition is to be prepared which is stable under extended freezer and refrigerator storage.

Without a flour having a reduced microbiological count, the resulting batters would rapidly deteriorate upon storage at ordinary refrigerator temperatures, even in the presence of anti-microbial ingredients. Moreover, without the enzymes being inactivated, there would be a substantial development of sugars from the available carbohydrates during refrigerator storage resulting in excessive browning or burning upon cooking at high temperatures (e.g. above 300° F., 150° C.) a food coated with the batter. It is preferred that the level of sugars in the batter composition be maintained below about 1% by weight of the composition to prevent excesive burning or browning at high temperatures (i.e. 300° to 350° F., 150° to 175° C. or greater). Further, without the enzymes being inactivated the flavor and color of the batter would be adversely affected during storage and preparation. Preferably these flours are employed at levels of from about 5 to about 15% based upon the weight of the total composition. With regard to the flour and the other "dry" ingredients, it is to be understood that this weight is the "as is" weight and includes its normal equilibrium moisture content.

Also desireable to the present invention is the presence of from about 1 to 20% starch by weight of the composition for the adhesion of the batter to the food during coating and cooking and for the resultant texture upon cooking. The starch can be of a wide variety of types, such as raw, pregelatinized and/or modified, and from a number of sources such as corn starch, arrowroot starch, waxy maize starch, tapioca starch, etc., and combinations thereof. Preferred among these starches are the pregelatinized modified starches such as pregelatinized modified corn starch. Preferably, the starch will be present in an amount of from about 5 to 10% based upon the weight of the composition.

Critically, to develop a suitable viscosity upon thawing and a desirably crispy texture upon frying an effective amount of a gum is employed. The amount of the gum will vary according to the particular gum but will generally fall within the range of 0.05 to 5% by weight of the final composition. It is presently preferred that the gum be one selected from the group consisting of hydroxypropyl methylcellulose, carboxymethylcellulose, alginates, xanthan gum and combinations thereof. Preferably, the gum will be employed at a level of from about 0.1 to 1.0% based upon the weight of the final composition.

Because the product must remain stable after defrosting and storage at an ordinary refrigerator temperature of about 40° F. (5° C.) for a period of at least 14 days, it is essential to employ a preservative system and preferably a specific flavoring system. Food preservatives such as methylparaben, butyl hydroxyanisol (BHA), propylparaben, potassium sorbate and combinations of these can be employed in suitably effective amounts to obtain the requisite stability. It will be understood further, that other added matrials such as various salts and acids, where desired for particular flavors or functionality may provide stability to a degree in their own right and will thus decrease the requirements for the preservative system. Accordingly, it is not possible to state a universally effective numerical definition of the level of preservatives. Typically, however, the preservative will be present in an overall combined weight of from about 0.02 to 1.0% based upon the total weight of the composition. Preferably, using the more preferred preservatives, this percentage will be within the range of from about 0.02 to about 0.2% by weight.

The stability of the batter composition has been found to be further enhanced by the use of a flavoring system wherein oleoresins extracted from natural spices are used instead of the natural ground spices. Exemplary of these oleoresins are extracts from onion, garlic, black pepper and paprika. These oleoresins when substitited for the ground natural spice help maintain a reduced plate cound and may even actively contribute to reducing microbial activity. In general, these oleoresins will be used to taste, generally at a level of 0.005 to 1.0% by weight of the composition, and will be incorporated plated onto a carrier such as salt.

In addition to the aqueous phase which is formed of the above materials, the composition of the present invention will preferably contain a fat phase. The fat phase will contain fat and an emulsifier. Among the suitable fats are those derived from vegetable and animal sources. It is preferred to employ those from vegetable sources such as soybean oil, corn oil, safflower oil, cottonseed oil, sunflower oil, palm oil, coconut oil, peanut oil, and the like. These oils may be in their pure liquid form or can be partially or totally hydrogenated. The fat can be either liquid or solid at refrigerator temperature, it being within the skill of the art to determine the proper level of solids which it can contain and yet form a batter which is suitable for dipping to coat food products. The fat will comprise from 0.3 to 55% by weight of the composition and the emulsifier will comprise from about 0.025 to about 10% by weight of the composition. More preferably, the fat will comprise from 1 to 10% by weight and the emulsifier will comprise from 0.05 to 5% by weight of the composition.

The emulsifier can be any material which is known to be suitable for emulsifying the particular fat employed and which can also aid in dispersing the gum within the fatty material during the preparation. Suitable emulsifiers include mono and diglycerides, with the preferred emulsifier being lecithin.

To prepare the batter, a stage-wise procedure is desired to assure proper blending of the materials so that a storage-stable emulsion of uniform consistency after storage and during use is achieved. In the initial stage of processing, the fat, the gum, and the emulsifier are blended to form a fat blend at a temperature effective to maintain the fat in the liquid state. The temperature is preferably kept below 120° F. (50° C.) during mixing to maintain the gum in solution. Typically, the mixing temperature will be within the range of from about 100° to about 120° F. (35° to 50° C.).

Separate from the above blending operation, a preservative solution is prepared by mixing the water with the preservative system for a time and at a temperature effective to dissolve the preservative system in the water. Typically, this will be carried out at a temperature within the range of from about 110° to about 160° F. (45° to 70° C.) and for a time of from about 3 to about 10 minutes.

After preparation of the preservative solution, the preservative solution and the fat blend are mixed under conditions of time, temperature, and agitation to produce an oil-in-water emulsion. Mixing times of on the order from about 5 to 10 minutes, and temperatures on the order from about 150° to about 160° F. (65° C. to 70° C.) are typical. After this period of time, it is preferable to cool the emulsion, such as in a plate and frame heat exchanger to reduce the temperature to preferably within the range of from about 50° to about 90° F. (10° C. to 35° C.). It is important to maintain the temperature below the gelatinization temperature of the flour and starch to prevent their gelatinization when added to the emulsion. Preferably, the temperature will be within the range of from about 80° to about 85° F. (25° C. to 30° C.).

A uniform dry blend comprising the flour and starch, as well as any other dry materials not previously added, is prepared by mixing the materials until uniform intermixing is achieved. Among the other dry materials which can be employed will be materials such as salt, dry seasonings, dry colors, and the like.

The resulting dry blend is then admixed with the oil-in-water emulsion at a temperature effective to form a uniform batter mixture. This batter admixture is then homogenized, such as in a typical dairy homogenizer, such as those of the two-stage type, to produce a smooth liquid batter. The pressures will be set in accordance with the skill of the art, and will typically be about 500 psig (35 kg/cm$^2$) first stage pressure and about 500 psig (35 kg/cm$^2$) second stage pressure.

The resulting smooth liquid batter should have viscosities within the ranges set forth in the following table:

| Viscosity Ranges (Centipoise, CPS) | | |
| --- | --- | --- |
| Optimum | Preferred | Broad |
| 2500 CPS | 1500–4000 CPS | 900–23,000 CPS |

(As measured using a Brookfield Synchro-lectric viscometer—Model Hat at 40° F. (5° C.) and 20 rpm using a #6 spindle)

It is desired to provide a smooth liquid batter which is drip resistant and is essentially stable as to the viscosity after storage for varying periods of time and under varying conditions.

Following preparation in the above described manner, the batter composition is metered into individual packages and frozen. The batter composition remains frozen until it is desired to use it. The batter composition can remain frozen for periods of about twelve months without deterioration in product quality. The batter can then be thawed by allowing it to sit in a refrigerator at a temperature of about 40° F. (5° C.) overnight or can be immersed, in water (hot or cold) until thawed. After thawing, the batter will remain stable in a refrigerator for a period of at least two weeks and preferably for periods up to 4 weeks. The frozen batter composition upon thawing can be coated (dipped) onto food pieces (e.g. chicken) followed by frying or baking to produce a high quality coated food. The resultant cooked and coated food has a coating which adheres to the food well and has a desired crisp texture and golden brown hue without excessive browning or burning even when cooked at high temperatures.

Best Mode for Carrying Out the Invention

The following example is presented for the purpose of further illustrating and explaining the present invention, and to show the best mode presently known for carrying it out. It is not meant to be limiting in any regard. Unless otherwise indicated, all parts and percentages are by weight, and refer to the ingredients on an as is basis, including their equilibrium moisture contents.

Example

This example shows the preparation of a batter according to the invention employing the following composition:

| Ingredient | Weight % |
| --- | --- |
| Water | 72.8 |
| Flour (heat treated, see U.S. Pat. No. 3,519,441) | 11.4 |
| Pregelatinized Modified Corn Starch | 8.8 |
| Vegetable Oil (Partially hydrogenated palm, soybean and cottonseed oil) | 2.4 |
| Dry Seasoning (Salt-63%, MSG-31%, Oleoresins of black pepper, garlic onion and paprika 6%) | 3.5 |
| Hydroxypropyl Methylcellulose | 0.7 |
| Lecithin | 0.2 |
| Preservatives (Propylparaben, Potassium Sorbate, Methylparaben, Propylene glycol, BHA and Citric Acid) | 0.2 |
| | 100.0 |

These ingredients are combined according to the following preferred stage-wise procedure:
1. In a first mixer:
   a. Weigh oil and lecithin into mixer with agitation.
   b. Melt oil/lecithin at 100° F. (38° C.).
   c. Add hydroxypropyl methylcellulose to melted oil and lecithin; agitate 5 minutes until thoroughly mixed.
2. In a second mixer:
   a. Add 160° F. (70° C.) water to jacketed mixer.
   b. Add preservative system.
   c. Agitate until solubilized.
   d. Add fat/lecithin/methylcellulose mixture to water/preservative system.
   e. Agitate at 160° F. (70° C.) for 5 minutes.
   f. Reduce temperature of mix to 80° to 85° F. (25° to 30° C.).
3. In a third mixer:
   Preblend the flour, pregelatinized modified cornstarch and seasoning.
4. In a fourth mixer:
   a. While agitating water, fat, lecithin, and preservative mixture, gradually add dry preblended mixture to jacketed mixer at 80° to 85° F. (25° to 30° C.).
   b. Agitate 5 to 10 minutes and pass through homogenizer.
5. Homogenize mixture at the following pressures:
   Second stage—500 psi (35 Kg/cm²)
   First stage—500 psi (35 Kg/cm²)
6. Cool batter composition to 35° to 40° F. (2° to 5° C.) using a heat exchanger.
7. Pump batter composition from the heat exchanger with agitation maintaining 40° F. (5° C.) temperature prior to carton fill.
8. Pass mixture to cartoner and fill to appropriate weight.
9. Pass cartons through freezing tunnel for freezing step.
10. Place finished packages in shipping cases and store in warehouse freezer at −10° F. (−23° C.).

When analyzed for viscosity and bacteria count after freezing and during storage at refrigerator temperatures the batter composition showed the following:

| | Viscosity | Bacteria Count (SPC) |
| --- | --- | --- |
| After defrosting frozen product | 2500 CPS | 4900 |
| 7 days refrigerated (@40° F., 5° C.) | 1500 CPS | 3700 |
| 14 days refrigerated (@40° F., 5° C.) | 1400 CPS | 5600 |

To measure product quality the batter composition was coated onto chicken pieces and fried at 350° F. (175° C.). A high quality, crisp and adherent coating resulted in which there was no substantial difference in product (coating) effectiveness or quality, before or after freezing, or after refrigerated storage. The fried coated chicken had a golden brown hue without excessive burning or browning before or after storage of the batter composition at refrigerator temperatures.

The above analyses shows the extended stability of the batter composition after freezing and refrigeration without substantial deterioration of product quality or viscosity, or without substantial increase in bacteria count.

The above description has been for the purpose of teaching the present invention to the person of ordinary skill in the art, and is not intended to detail each and every obvious modification and variation of it which will become apparent upon reading. It is intended, however, to include all such obvious modifications and variations within the scope of the present invention which is defined in the following claims.

We claim:

1. An aqueous coating batter composition, said batter being capable of extended storage in the frozen state followed by 40° F. storage for at least 14 days without the formation of sugar or growth of bacteria and said batter containing, all percents being by weight of the batter composition:
   (a) a continuous aqueous phase comprising from 20 to 85% water, from 3 to 30% flour which has been heat treated under conditions effective to eliminate substantially all viable microorganisms and to inactivate enzyme activity, from 1 to 20% of a starch, an amount of a gum effective to thicken the batter and provide a crisp mixture upon cooking, from 0.02 to 1.0% of food preservatives and from 0.005 to 1.0% of oleoresins extracted from natural spices; and,
   (b) a discontinuous fat phase comprising from 0.3 to 55% of a fat and from 0.025 to 10% of an emulsifier.

2. An aqueous batter composition according to claim 1 wherein the aqueous phase comprises from 60 to 75% water, from 5 to 15% flour, from 5 to 10% starch, from 0.05 to 5.0% gum, and less than about 1% of a sugar.

3. An aqueous batter composition according to claim 2 comprising from 1 to 10% fat, from 0.05 to 5% emulsifier and from 0.1 to 1.0% gum.

4. An aqueous batter composition according to claim 3 wherein the fat comprises vegetable oil and the emulsifier comprises lecithin.

5. An aqueous batter according to claim 4 wherein the starch comprises pregelatinized modified corn starch.

6. An aqueous batter according to claim 1 wherein the food preservatives are present at a combined weight of from 0.02 to about 0.2% by weight and are selected from the group consisting of methylparaben, butyl hydroxyanisol, propylparaben, potassium sorbate and combinations thereof.

7. An aqueous batter according to claim 2 wherein the gum is selected from the group consisting of carboxymethylcellulose, hydroxypropyl methylcellulose, alginates, xanthan gum and combinations thereof.

8. An aqueous batter composition according to claim 1 in frozen form at a temperature of less than 32° F.

9. An aqueous batter composition according to claim 2 which exhibits a viscosity within the range of from 900 to 23,000 centipoises as measured with a Brookfield viscometer at 40° F. and 20 rpm using a #6 spindle.

10. An aqueous batter composition according to claim 9 wherein the viscosity is within the range of from 1500 to 4000 centipoises.

11. A process for preparing an aqueous batter composition according to claim 1 which comprises:
blending the fat, the gum and the emulsifier to form a fat blend, at a temperature effective to maintain the fat in the liquid state and the gum in solution;
blending the water with the food preservatives for a time and at a temperature effective to dissolve the preservative system to form a preservative solution;
blending the fat blend with the preservative solution under conditions of time, temperature and agitation effective to produce an oil-in-water emulsion;
blending the flour and starch to form a uniform dry blend;
admixing the dry blend with the oil-in-water emulsion maintaining the admixture at a temperature less than the gelatinization temperature of the flour and starch; and
homogenizing the batter admixture under conditions effective to produce a smooth liquid batter.

12. A process according to claim 9 which further comprises metering the batter into containers and freezing.

13. A process according to claim 9 wherein the aqueous phase of the batter composition comprises from 60 to 75% water, from 5 to 15% flour, from 5 to 10% starch, from 0.1 to 1.0% gum, and less than about 1% of a sugar.

14. A process according to claim 13 wherein the fat phase of the batter composition comprises from 1 to 10% fat and from 0.05 to 5% emulsifier.

15. A process according to claim 16 wherein the fat comprises vegetable oil and the emulsifier comprises lecithin.

16. A process according to claim 13 wherein the starch comprises pregelatinized modified corn starch.

17. A process according to claim 11 wherein the food preservatives are present at a combined weight of from about 0.02 to about 0.2% and are selected from the group consisting of methylparaben, butyl hydroxyanisol, propylparaben, potassium sorbate and combinations thereof.

18. A process according to claim 13 wherein the gum is selected from the group consisting of hydroxypropyl methylcellulose, carboxymethylcellulose, alginates, xanthan gum and combinations thereof.

19. A process according to claim 11 wherein the composition is frozen at a temperature of less than 32° F.

20. A process according to claim 11 wherein the batter exhibits a viscosity within the range of from 900 to 23,000 centipoises as measured with a Brookfield viscometer at 40° F. and 20 rpm using a #6 spindle.

21. A process according to claim 20 wherein the batter exhibits a viscosity within the range of from 1500 to 4000 centipoises.

* * * * *